United States Patent
Jinno et al.

(10) Patent No.: US 8,694,708 B2
(45) Date of Patent: Apr. 8, 2014

(54) EXPANDER TO CONTROL MULTIPATHS IN A STORAGE NETWORK

(75) Inventors: Mitsutoshi Jinno, Yamato (JP);
Hiroyuki Miyoshi, Kawasaki (JP);
Yoshihiko Terashita, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/592,529

(22) Filed: Aug. 23, 2012

(65) Prior Publication Data
US 2012/0324137 A1 Dec. 20, 2012

Related U.S. Application Data

(63) Continuation of application No. 13/189,253, filed on Jul. 22, 2011.

(30) Foreign Application Priority Data

Jul. 23, 2010 (JP) .................. 2010-165540

(51) Int. Cl.
*G06F 13/40* (2006.01)
*H04L 12/56* (2006.01)
*H04L 12/24* (2006.01)

(52) U.S. Cl.
CPC .......... *G06F 13/4045* (2013.01); *G06F 13/404* (2013.01); *H04L 41/12* (2013.01); *H04L 45/00* (2013.01)
USPC .......... 710/300; 710/311; 710/313; 710/314; 370/254; 370/392

(58) Field of Classification Search
CPC ... G06F 13/00; G06F 13/385; G06F 13/4045; G06F 13/4282; G06F 3/0665; H04L 67/1097; H04L 45/00

USPC ......................................... 710/313
See application file for complete search history.

(56) References Cited

U.S. PATENT DOCUMENTS

| | | | |
|---|---|---|---|
| 7,519,854 B2 | 4/2009 | Lucas et al. | |
| 7,624,223 B2 | 11/2009 | Clegg et al. | |
| 7,668,925 B1 | 2/2010 | Liao et al. | |
| 7,849,248 B2 | 12/2010 | Johnson et al. | |

(Continued)

FOREIGN PATENT DOCUMENTS

| | | |
|---|---|---|
| JP | 2008158666 | 7/2008 |
| JP | 2008250631 | 10/2008 |

OTHER PUBLICATIONS

"U.S. Appl. No. 13/189,253 NFOA", Mar. 20, 2013, 12 pages.

*Primary Examiner* — Ryan Stiglic
(74) *Attorney, Agent, or Firm* — DeLizio Gilliam, PLLC

(57) ABSTRACT

A SAS expander forms a first path coupling the SAS initiator and a first port of a SAS target together. The first SAS expander notifies the SAS initiator of a virtual expander address instead of a SAS address of the first SAS expander. The first SAS expander notifies the SAS initiator of a virtual target port address, at least instead of a SAS address of the first port of the SAS target. A second SAS expander forms a second path coupling the SAS initiator and a second port of the SAS target together. The second SAS expander notifies the SAS initiator of the virtual expander address instead of a SAS address of the second SAS expander. The second SAS expander notifies the SAS initiator of the virtual target port address, at least instead of a SAS address of the second port of the SAS target.

10 Claims, 9 Drawing Sheets

(56) References Cited

U.S. PATENT DOCUMENTS

| | | |
|---|---|---|
| 8,077,605 B2 | 12/2011 | McCarty et al. |
| 8,171,176 B2 | 5/2012 | Battacharya et al. |
| 8,244,948 B2 | 8/2012 | Johnson et al. |
| 8,321,596 B2 | 11/2012 | Johnson et al. |
| 2007/0165660 A1 | 7/2007 | Fang et al. |
| 2009/0150643 A1 | 6/2009 | Jones et al. |
| 2010/0064060 A1 | 3/2010 | Johnson et al. |
| 2010/0064084 A1 | 3/2010 | Johnson et al. |
| 2010/0064085 A1 | 3/2010 | Johnson et al. |
| 2010/0064086 A1 | 3/2010 | McCarty et al. |
| 2010/0241779 A1 | 9/2010 | Johnson et al. |
| 2012/0023278 A1 | 1/2012 | Jinno et al. |

| | SAS ADDRESS OF TARGET PORT A | SAS ADDRESS OF TARGET PORT B | ADDRESS OF VIRTUAL TARGET PORT | ADDRESS OF PRIORITY TARGET PORT | ADDRESS OF CURRENT ACCESS PORT |
|---|---|---|---|---|---|
| #1 | D1A | D1B | D1 | D1A | D1A |
| #2 | D2A | D2B | D2 | D2A | D2A |
| #3 | D3A | D3B | D3 | D3A | D3A |

FIG. 3

EXPANDER TO CONTROL MULTIPATHS IN A STORAGE NETWORK

CROSS-REFERENCE TO RELATED APPLICATIONS

This application is a continuation application that claims the benefit under 35 U.S.C. §120 of U.S. patent application Ser. No. 13/189,253 filed on Jul. 22, 2011, which claims priority under 35 U.S.C. §119 to Japanese Patent Application Number 2010165540 filed Jul. 23, 2010, both of which are incorporated herein in their entirety.

BACKGROUND

Embodiments of the present invention relate generally to controlling a multipath. More particularly, embodiments of the present invention relate to controlling a multipath in a serial attached SCSI (SAS) network.

Many storage networks have a multipath configuration which is a redundant configuration having duplicate paths from a host to one or more storage devices. For example, in a multipath configuration in a SAS storage network, a host has two SAS initiator ports, a storage device has two SAS target ports, and two redundant SAS links from the two SAS target ports of the storage device are connected to the SAS initiator ports of the host, respectively. The multipath configuration allows each of the SAS initiator ports to access a corresponding one of the SAS target ports. Even though a failure occurs on one path, this multipath configuration enables the host to access the storage device through the other path. Thus, a multipath configuration enhances the availability of the storage device.

However, the building-up of such a multipath configuration alone makes a single storage device appear as different storage devices to the host. In addition, when a failure occurs on one path, conventional multipath configurations do not allow automatic switch-over between paths.

To address these shortcomings of conventional multipath configurations, software for controlling the multipath (hereinafter, referred to as a "multipath driver") is generally installed on a host. The multipath driver controls the number of storage devices recognized or "seen" by the host, detects a failure on a path, and performs a switch-over between paths at the time the failure is detected. In other words, the multipath driver makes the multipath transparent to applications of the host.

In existing multipath configuration systems including multipath drivers however, it is necessary to install different multipath drivers depending on interfaces used in the storage network. Furthermore, even if a common interface is used in the entire storage network, it is necessary to install different multipath drivers on hosts in a case where the hosts have different operating systems (OSs), a case where storage products or switching products of different vendors are connected to the hosts, or in other similar cases where differences exist between components of the storage network. For at least this reason, introduction of a multipath configuration is troublesome. Moreover, some combinations of multipath drivers are known to cause unexpected operations or storage network failures. Consequently, careful combination and verification work needs to be performed prior to the start of current multipath storage network operation.

SUMMARY

Embodiments of the present invention provide methods for controlling an expander to control multipaths in a storage network. The storage network comprises a SAS initiator; a SAS target including a first port and a second port; a first SAS expander that forms a first path coupling the SAS initiator and the first port of the SAS target together; and a second SAS expander that forms a second path coupling the SAS initiator and the second port of the SAS target together. The first SAS expander notifies the SAS initiator of a virtual expander address instead of its own SAS address, the virtual expander address being a virtual SAS address owned in common by the first SAS expander and the second SAS expander. The first SAS expander further notifies the SAS initiator of a virtual target port address, at least instead of a SAS address of the first port of the SAS target, the virtual target port address being a SAS address of a virtual port of the SAS target. The second SAS expander notifies the SAS initiator of the virtual expander address instead of its own SAS address, and further notifies the SAS initiator of the virtual target port address, at least instead of a SAS address of the second port of the SAS target. The SAS initiator recognizes that a single SAS expander is connected to a wide port of the SAS initiator itself, upon being notified of the virtual expander address by the first and second SAS expanders, and further recognizes that the SAS target is connected to the single SAS expander through a port, upon being notified of the virtual target port address by the first and second SAS expanders.

BRIEF DESCRIPTION OF THE DRAWINGS

FIG. 3 shows an example of a target-port configuration table used in an embodiment of the present invention.

FIG. 5-1 is a flowchart showing an example of an operation of the SAS expander in an embodiment of the present invention at the time of generating virtual topology.

FIG. 5-2 is a flowchart showing an example of an operation of the SAS expander in an embodiment of the present invention at the time of reporting virtual topology.

DESCRIPTION OF EMBODIMENT(S)

Figure 1:
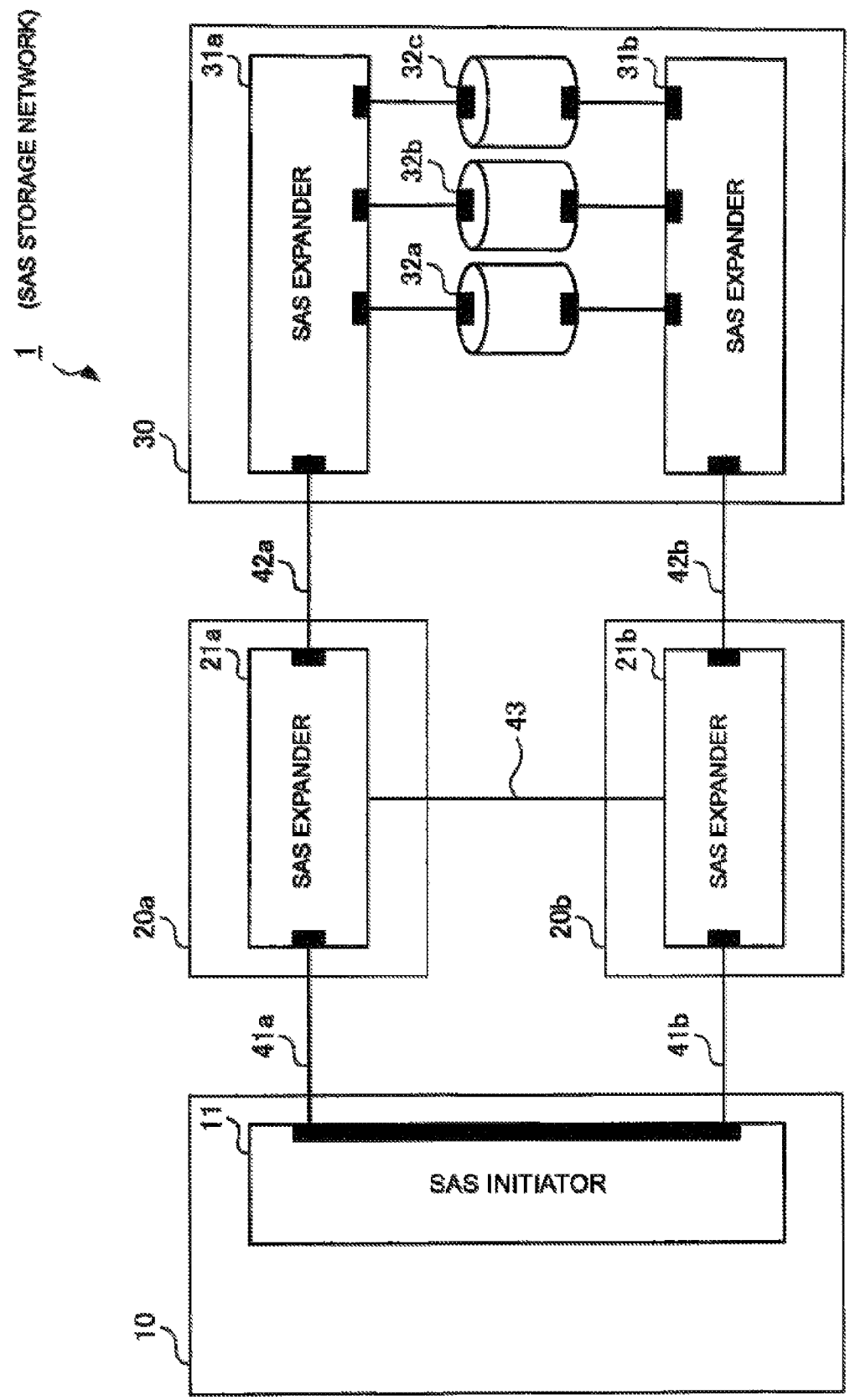
FIG. 1 is a block diagram showing a configuration example of a SAS storage network in an embodiment of the present invention.

Herein below, a description is given in detail of embodiments of the present invention with reference to the attached drawings.

One embodiment of the present invention provides a system for controlling a multipath in a Serial Attached SCSI (SAS) network comprising a SAS initiator; a SAS target including a first port and a second port; a first SAS expander that forms a first path by connecting the SAS initiator and the first port of the SAS target together; and a second SAS expander that forms a second path by connecting the SAS initiator and the second port of the SAS target together, wherein the first SAS expander notifies the SAS initiator of a virtual expander address instead of its own SAS address, the virtual expander address being a virtual SAS address owned in common by the first SAS expander and the second SAS expander, and notifies the SAS initiator of a virtual target port address, at least instead of a SAS address of the first port of the SAS target, the virtual target port address being a SAS address of a virtual port of the SAS target, the second SAS expander notifies the SAS initiator of the virtual expander address instead of its own SAS address, and notifies the SAS initiator of the virtual target port address, at least instead of a SAS address of the second port of the SAS target, and the SAS initiator recognizes that a single SAS expander is connected to a wide port of the SAS initiator itself, when being notified of the virtual expander address by the first SAS expander and the second SAS expander, and recognizes that the SAS target is connected to the single SAS expander through a port, when being notified of the virtual target port address by the first SAS expander and the second SAS expander.

In the described system, upon receipt of data having the virtual target port address as a destination address, each of the first SAS expander and the second SAS expander transmits the data to the SAS target by using as the destination address a SAS address assigned to a currently used one of the first port and the second port, and associated with the virtual target port address.

Moreover, in the described system, upon detection of a failure on a path to a specific one of the first port and the second port, each of the first SAS expander and the second SAS expander changes the SAS address assigned to the currently used port and associated with the virtual target port address to a SAS address assigned to the other one of the first port and the second port which is other than the specific port.

In a further embodiment of the present invention a device is provided that functions as a SAS expander connecting a SAS initiator and a SAS target together, the device comprising a first notification unit that performs a process of causing the SAS initiator to recognize a configuration where the device itself and a different device serving as SAS expanders are connected to the SAS initiator as a configuration where a single device serving as a SAS expander is connected to a wide port of the SAS initiator, the process including notifying the SAS initiator of a virtual expander address instead of the device's own SAS address, the virtual expander address being a virtual SAS address owned in common by the device itself and the different device; and a second notification unit that performs a process of causing the SAS initiator to recognize a configuration where a first port of the SAS target is connected to the device itself and a second port of the SAS target is connected to the different device as a configuration where a port of the SAS target is connected to the single device, the process including notifying the SAS initiator of a virtual target port address, at least instead of a SAS address of a first port of the SAS target, the virtual target port address being a SAS address of a virtual port of the SAS target.

Here, the described device may further comprise a storage unit that stores association information in which the virtual target port address and a SAS address of a currently used one of the first port and the second port are associated with each other; a receiver that receives data having the virtual target port address as a destination address from the SAS initiator; a determination unit that determines, as the destination address of the data received by the receiver, the SAS address assigned to the currently used port and associated with the virtual target port address in the association information; and a transmitter that transmits the data received by the receiver by using as the destination address the SAS address assigned to the currently used port determined by the determination unit.

In addition, the described device may further comprise a detection unit that detects a failure on a path to a specific one of the first port and the second port; and a change unit that changes the SAS address of the currently used port in the association information to a SAS address of the other one of the first port and the second port which is other than the specific port, upon detection of the failure on the path to the specific port by the detection unit.

In yet another embodiment of the present invention, a device is provided that serves as a SAS expander connecting a SAS initiator and a SAS target together, the devices comprising a first notification unit that performs a process of causing the SAS initiator to recognize a configuration where the device itself and a different device serving as SAS expanders are connected to the SAS initiator as a configuration where a single device serving as a SAS expander is connected to a wide port of the SAS initiator, the process including notifying the SAS initiator of a virtual expander address instead of the device's own SAS address, the virtual expander address being a virtual SAS address owned in common by the device itself and the different device; a second notification unit that performs a process of causing the SAS initiator to recognize a configuration where a first port of the SAS target is connected to the device itself and a second port of the SAS target is connected to the different device as a configuration where a port of the SAS target is connected to the single device, the process including notifying the SAS initiator of a virtual target port address, at least instead of a SAS address of a first port of the SAS target, the virtual target port address being a SAS address of a virtual port of the SAS target; a storage unit that stores association information in which a SAS address of the first port, a SAS address of the second port, the virtual target port address, a SAS address of a priority port which is one of the first port and the second port, and a SAS address of a currently used one of the first port and the second port are associated with one another; a detection unit that detects a failure on a path to a specific one of the first port and the second port; a setting unit that sets the SAS address of the priority port as the SAS address of the currently used port in the association information when the detection unit detects no failure on the path to the specific port, and that sets a SAS address assigned to the other one of the first port and the second port which is other than the specific port as the SAS address assigned to the currently used port in the association information when the detection unit detects a failure on the path to the specific port; a receiver that receives data having the virtual target port address as a destination address from the SAS initiator; a determination unit that determines as the destination address of the data received by the receiver, the SAS address assigned to the currently used port and associated with the virtual target port address in the association information; and a transmitter that transmits the data received by the receiver by using as the destination address the SAS address assigned to the currently used port and determined by the determination unit.

In another embodiment of the present invention a method is provided for controlling a multipath in a SAS network including a SAS initiator, a SAS target, a first SAS expander and a second SAS expander, the method comprising forming, by the first SAS expander, a first path coupling the SAS initiator and a first port of the SAS target together; notifying, by the first SAS expander, the SAS initiator of a virtual expander address instead of the first SAS expander's own SAS address, the virtual expander address being a virtual SAS address owned in common by the first SAS expander and the second SAS expander; notifying, by the first SAS expander, the SAS initiator of a virtual target port address, at least instead of a SAS address of the first port of the SAS target, the virtual target port address being a SAS address of a virtual port of the SAS target; forming, by the second SAS expander, a second path coupling the SAS initiator and a second port of the SAS target together; notifying, by the second SAS expander, the SAS initiator of the virtual expander address instead of the second SAS expander's SAS address; notifying, by the second SAS expander, the SAS initiator of the virtual target port address, at least instead of a SAS address of the second port of the SAS target; recognizing, by the SAS initiator, that a single SAS expander is connected to a wide port of the SAS initiator itself, in response to notification of the virtual expander address by the first SAS expander and the second SAS expander; and recognizing, by the SAS initiator, that the SAS target is connected to the single SAS expander through a port, in response to notification of the virtual target port address by the first SAS expander and the second SAS expander.

In a still further embodiment, a program product is provided which is configured to cause a computer to function as a SAS expander coupling a SAS initiator and a SAS target together, the program causing the computer to function as a first notification unit that performs a process of causing the SAS initiator to recognize a configuration where the computer itself and a different device or computer, both serving as SAS expanders, are connected to the SAS initiator as a configuration where a single device serving as a SAS expander is coupled to a wide port of the SAS initiator, the process including notifying the SAS initiator of a virtual expander address instead of a SAS address of the computer, the virtual expander address being a virtual SAS address owned in common by the computer and the different device or computer; and a second notification unit that performs a process of causing the SAS initiator to recognize a configuration where a first port of the SAS target is connected to the computer and a second port of the SAS target is connected to the different device or computer as a configuration where a port of the SAS target is connected to the single device, the process including notifying the SAS initiator of a virtual target port address, at least instead of a SAS address of a first port of the SAS target, the virtual target port address being a SAS address of a virtual port of the SAS target.

A SAS storage network according to one or more illustrative embodiments of the present invention includes multiple SAS devices (a SAS initiator and SAS targets) coupled together using SAS expanders.

In one embodiment of the present invention, characteristics of SAS are utilized in such a SAS storage network without departing from SAS standards, and thereby a multipath control function is installed on the SAS expanders used for configuring a multipath. Specifically, among the SAS characteristics, attention is paid to multilane connections and a SAS topology discovery process using a SAS management protocol (SMP) so that a function of reporting a host-specific virtual SAS topology to each host and a function of converting a SAS address are added to the SAS expanders.

The described techniques make it possible to make it appear from a host perspective that a single, highly-reliable, SAS storage is connected to the host through a multilane port without the need for a special host bus adapter (HBA) or storage device or for the installation of special software such as a multipath driver on the host.

FIG. 1 is a block diagram showing a configuration example of a SAS storage network 1 according to one embodiment of the present invention. As illustrated therein, SAS storage network 1 includes a SAS host 10, SAS switches 20a-20b, and a SAS storage subsystem 30. SAS host 10 of the embodiment of FIG. 1 is a computer that accesses SAS storage subsystem 30 via SAS switches 20a-20b and may be simply referred to as a "host." For example, if SAS storage network 1 is a blade server system, SAS host 10 is a blade server accommodating components such as a microprocessor, a memory, and a network controller therein all together. SAS host 10 includes a unit that serves as a SAS initiator 11. Specifically, the unit that serves as SAS initiator 11 is a HBA in one embodiment.

Further, in this embodiment, SAS initiator 11 is configured to include a wide port as a single SAS initiator port (hereinafter, simply referred to as an "initiator port") as will be described, the wide port is depicted by a portion filled in black in SAS initiator 11. Redundant links 41a-41b from SAS expanders 21a, 21b, respectively, are put together as a multilane and connected to the wide port. Consequently, the wide port is assigned a single SAS address. Hereinafter, H is given as the described SAS address. Note that since a wide port function using a multilane is supported in SAS as a standard function, such a configuration can be provided without the need for special software.

SAS switches 20a-20b are switch modules that form respective multiple paths or "multipaths" by connecting SAS host 10 and SAS storage subsystem 30 together.

SAS switches 20a-20b include units serving as SAS expanders 21a-21b, respectively. In this embodiment, SAS expander 21a is provided as an example of a first SAS expander, and SAS expander 21b is provided as a second SAS expander.

Further, from SAS storage subsystem 30, link 42a is connected to SAS expander 21, and link 42b is connected to SAS expander 21b. In addition, SAS expanders 21a-21b are also connected to each other, thus forming a bridge 43.

Meanwhile, FIG. 1 shows each of SAS expanders 21a-21b. If discrimination thereof from each other is not required, each of SAS expanders 21a-21b may be referred to simply as a SAS expander 21. In addition, although two SAS expanders 21 are shown herein, the number of SAS expanders 21 is not necessarily limited to two.

SAS storage subsystem 30 is a subsystem that stores data received from SAS host 10 and transmits the stored data to SAS host 10.

SAS storage subsystem 30 includes units that function as SAS expanders 31a, 31b and units that function as SAS targets 32a, 32b, and 32c. Specifically, the units that serve as SAS expanders 31a-31b are, for example, SAS storage controllers that control SAS storage. Each of the units that serve as SAS targets 32a-32c is, for example, a SAS storage device having two SAS target ports (hereinafter, each simply referred to as a "target port"). Each of the two target ports has a SAS address. Hereinafter, concerning the SAS addresses of the two target ports of each of SAS targets 32a-32c, target ports coupled to SAS expander 31a have SAS addresses of D1A, D2A, and D3A, respectively, while target ports coupled to SAS expander 31b have SAS addresses of D1B, D2B, and D3B. In this embodiment, each target port coupled to SAS expander 31a is used as an example of a first port, and each target port coupled to SAS expander 31b is used as a second port.

Meanwhile, FIG. 1 shows each of SAS targets 32a-32c. If discrimination thereof from each other is not required, each of SAS targets 32a, 32b, and 32c may be referred to simply as a SAS target 32. In addition, although three SAS targets 32 are shown and described herein, the number of SAS targets 32 is not necessarily limited to three.

In the configuration of FIG. 1, there are the following four physical paths (x=1, 2, 3) from SAS host 10 to SAS target 32.
(A) Initiator port H→link 41a→link 42a→target port DxA
(B) Initiator port H→link 41a→bridge 43→link 42b→target port DxB
(C) Initiator port H→link 41b→link 42b→target port DxB
(D) Initiator port H→link 41b→bridge 43→link 42a→target port DxA In this embodiment, the paths A and D are used as examples of a first path, and the paths B and C are used as examples of a second path.

Meanwhile, special software such as a multipath driver is not installed on SAS host 10 in this embodiment, as described above.

However, if a multipath driver or the like is not installed on SAS host 10 without any modification of the configuration shown in FIG. 1, SAS host 10 sees SAS target 32 as multiple SAS targets 32, because SAS host 10 can access each of the two target ports of SAS target 32 through different paths.

Hence, in order to control the number of SAS targets 32 seen from SAS host 10 and control the access paths to SAS targets 32 the following functions are provided to SAS expanders 21a-21b directly connected to SAS host 10:
(1) Target-port configuration table;
(2) Reporting a host-specific virtual SAS topology to each corresponding one of the hosts; and
(3) Controlling a path by converting a SAS address of a target port.

Next, a description is given of a functional configuration of SAS expander 21 provided with the indicated functions. Note that the same functional configuration is provided to SAS expanders 21a-21b, and thus the description is herein given by taking the functional configuration thereof as a functional configuration of SAS expander 21.

Figure 2:
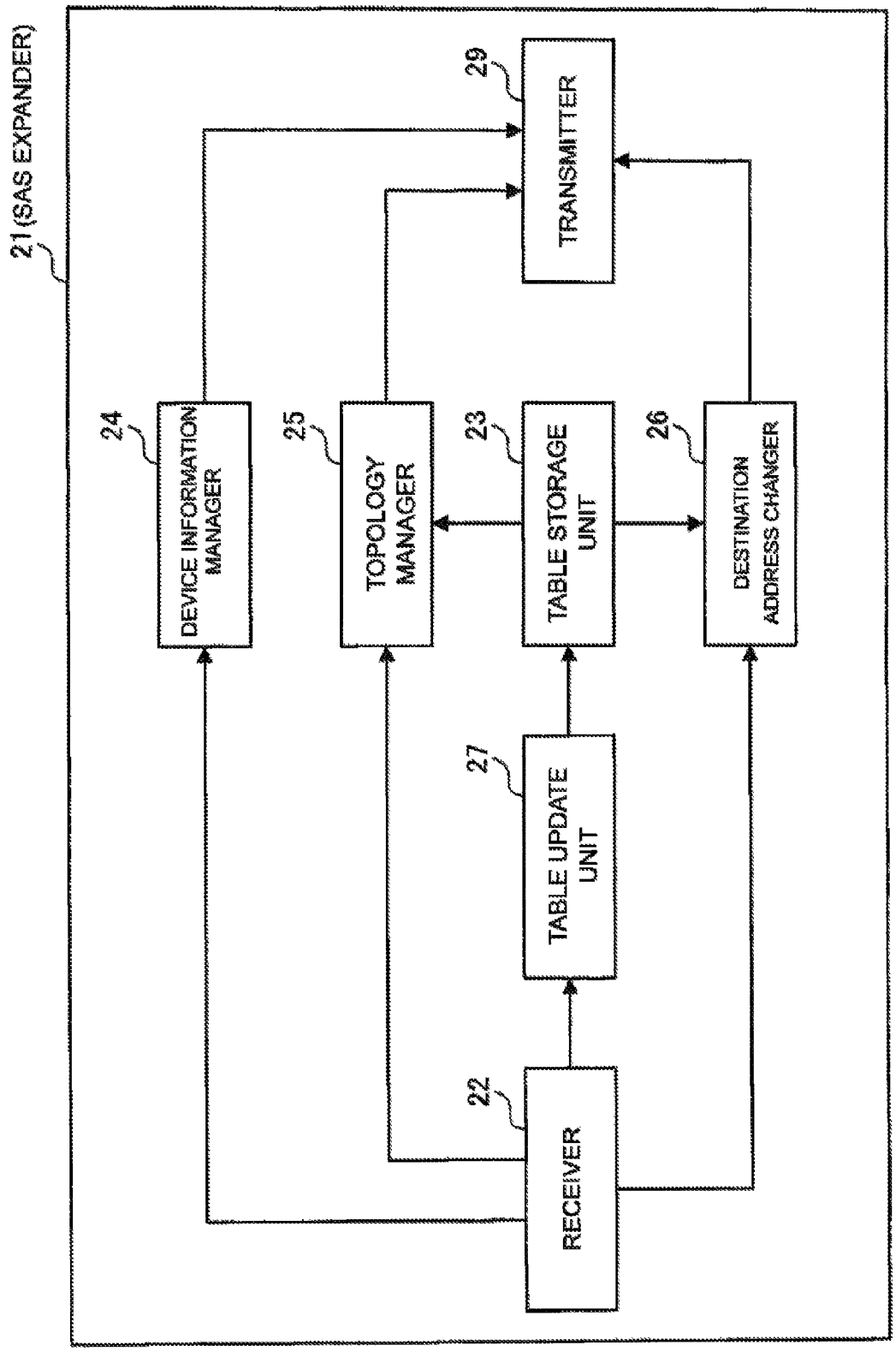
FIG. 2 is a block diagram showing a configuration example of a SAS expander in an embodiment of the present invention.

FIG. 2 is a block diagram showing a functional configuration example of SAS expander 21 in an embodiment of the present invention.

As illustrated therein, SAS expander 21 includes a receiver 22, a table storage unit 23, a device information manager 24, a topology manager 25, a destination address changer 26, a table update unit 27, and a transmitter 29.

Receiver 22 receives an Identify Address frame transmitted at the time of initialization by SAS initiator 11. Receiver 22 also receives a SAS topology request transmitted by SAS initiator 11 at the time of execution of a SAS discovery process and a reply in response to a SAS topology request transmitted at the time of execution of the SAS discovery process by a corresponding one of SAS switches 20a, 20b. Further, receiver 22 receives a SAS frame transmitted by SAS initiator 11. Still further, receiver 22 receives information for detecting a failure on a path. In this embodiment, receiver 22 is provided as an example of a receiver that receives data and a detection unit that detects a failure on a path to a specific port.

Table storage unit 23 stores a target-port configuration table in which target ports to be accessed by SAS initiator 11 and the like are defined. The target-port configuration table will be described in detail herein. In this embodiment, table storage unit 23 is provided as an example of a storage unit that stores association information.

Device information manager 24 manages device information indicating that the device type is a SAS expander and including a virtual SAS address thereof (hereinafter, referred to as a "virtual expander address").

Topology manager 25 manages information for executing a process for discovering SAS topology (SAS discovery process) and generates a virtual SAS topology (hereinafter, referred to as a "virtual topology") based on SAS topology information acquired by executing the SAS discovery process. The virtual topology in particular includes SAS addresses (hereinafter, each referred to as a "virtual target port address") of virtual target ports of SAS targets 32.

Destination address changer 26 changes a destination address of the SAS frame received by receiver 22 utilizing the target-port configuration table. In this embodiment, destination address changer 26 is provided as an example of a determination unit that determines a SAS address of a currently used port as a destination address of data.

Table update unit 27 updates the target-port configuration table stored in table storage unit 23 so that a target port to be accessed by SAS initiator 11 can be switched over when a path failure is detected based on the information received by receiver 22. In this embodiment, table update unit 27 is provided as an example of a switch-over unit that switches over the SAS address of the currently used port to a SAS address of a port other than a specific port and a setting unit that sets the SAS address of the port other than the specific port as the SAS address of the currently used port.

When receiving an Identify Address frame from SAS initiator 11, transmitter 29 transmits, to SAS initiator 11, information indicating a SAS expander device type and including a virtual expander address thereof. When detecting a link reset or receiving a change broadcast, transmitter 29 transmits a SAS topology request to other devices. Transmitter 29 then transmits a virtual topology in response to the SAS topology request from SAS initiator 11. Further, transmitter 29 transmits the SAS frame to SAS target 32. In this embodiment, transmitter 29 is provided as an example of a first notification unit that notifies a SAS initiator of a virtual expander address, a second notification unit that notifies the SAS initiator of a virtual target port address, and a transmitter that transmits data.

Hereinafter, a description is given of the functions (1) to (3) provided by SAS expander 21.
(1) Target-Port Configuration Table FIG. 3 shows an example of the target-port configuration table stored in table storage unit 23 of SAS expander 21.

As illustrated therein, the target-port configuration table has as many entries as the storage devices provided for access to SAS host 10. Since SAS targets 32a-32c are shown in FIG. 1, entries #1, #2, and #3 corresponding to respective SAS targets 32 are provided in FIG. 3.

In the illustrated target-port configuration table, a value is set for each of the following items in each entry.

The first item is a SAS address of a target port (represented by a target port A in FIG. 3) coupled to SAS expander 31a of a corresponding SAS target 32. Here, according to the description of FIG. 1, SAS addresses D1A, D2A, and D3A are stored in the entries #1, #2, and #3, respectively.

The second item is a SAS address of a target port (represented by a target port B in FIG. 3) coupled to SAS expander 31b of a corresponding SAS target 32. Here, according to the description of FIG. 1, SAS addresses D1B, D2B, and D3B are stored in the entries #1, #2, and #3, respectively.

The third item is a virtual target port address of SAS target 32. Here, D1 is set as a virtual target port address for D1A and D1B; D2, for D2A and D2B; and D3, for D3A and D3B.

The fourth item is a SAS address of one of the two target ports of SAS target 32, the target port being preferentially used to be accessed (hereinafter, referred to as a "priority target port"). Here, the target port coupled to SAS expander 31a of SAS target 32 is set as the priority target port.

The fifth item is a SAS address of one of the two target ports of SAS target 32 being currently used (hereinafter, referred to as a "current access port"). Note that since the priority target port is set as the current access port in an initial state, FIG. 3 shows the state at that time.

It is recommended that the target-port configuration table be transmitted to SAS expander 21 using SMP by SAS host 10 or another server for SAS management. Alternatively, the target-port configuration table may be set by using a management user interface such as a web interface through a communication line.

A new SAS address may be generated as the virtual target port address to be set in the target-port configuration table, as shown in FIG. 3. Alternatively, if a virtual SAS address (a SAS device name or the like, for example) has already been provided to SAS target 32, this existing virtual SAS address may be used.

Note that the target-port configuration table is provided to each of SAS expanders 21a-21b in the described embodiment and the target-port configuration tables of respective SAS expanders 21a-21b are synchronized.

(2) Reporting Host-Specific Virtual SAS Topology to Host

SAS initiator 11 identifies a connection destination at the time of initialization of the SAS ports. Specifically, by using the Identify Address frame, SAS initiator 11 identifies the device type and the SAS address of the devices connected to the PHYs of SAS initiator 11. In this embodiment, SAS initiator 11 transmits the Identify Address frame to each of SAS expanders 21a-21b.

In response to this, SAS expanders 21 each notify SAS initiator 11 of the same virtual expander address instead of their SAS addresses.

Figure 4:
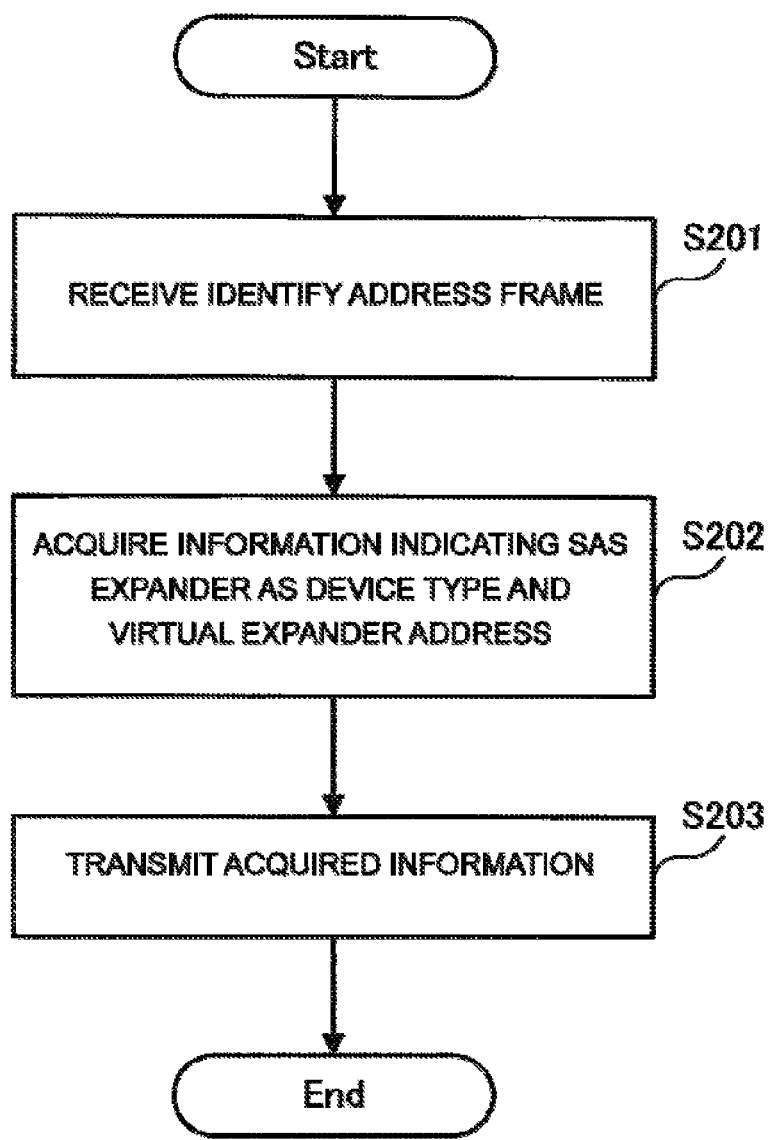
FIG. 4 is a flowchart showing an example of an operation of the SAS expander in an embodiment of the present invention at the time of reporting virtual topology.

FIG. 4 is a flowchart showing an example of an operation of SAS expanders 21 according to an embodiment of the present invention.

In each of SAS expanders 21, receiver 22 receives an Identify Address frame from SAS initiator 11 (Step 201).

Then, device information manager 24 acquires information indicating that the device type of SAS expander 21 is a SAS expander and a virtual expander address as a SAS address owned in common by SAS expanders 21a-21b (Step 202). Note that the virtual expander address may be stored in advance in a memory in SAS expander 21 (not illustrated).

Subsequently, transmitter 29 transmits the device type and the SAS address acquired by device information manager 24 to SAS initiator 11 (Step 203).

As a result, an HBA of SAS host 10 determines that two PHYs thereof are connected to the same SAS expander and thus configures a single two-lane port. This is because, when multiple PHYs are connected to the same SAS expander, the HBA forms a wide port and causes the multiple PHYs to function as a single port.

Thereafter, SAS initiator 11 executes a process for discovering SAS topology (SAS discovery process). A device having executed the SAS discovery process can know a device type, a SAS address, a supported protocol, and a SAS expander connected thereto of each device existing in the SAS domain. SAS initiator 11 executes and utilizes the discovery process to identify a connectable SAS address and a connection rate.

Note that SAS expander 21 generally builds up a routing table for routing a SAS frame. As a method for building up the routing table for itself, two example methods are described. Self configuration is one method or technique in which a routing table is built up by executing the SAS discovery process and acquiring information. According to another method, external configuration is performed in which a routing table is set up in SAS expander 21 by an external device (SAS initiator 11, for example) using SMP.

In the embodiment of FIG. 4, self-configuration is supported. In other words, SAS expander 21 executes the SAS discovery process for building up its own routing table.

Meanwhile, as described above, SAS initiator 11 executes the SAS discovery process and thereby requests SAS expander 21 for SAS topology.

In response to this, SAS expander 21 notifies SAS initiator 11 of a virtual SAS topology (virtual topology) including the single virtual target port address instead of the actual SAS topology including real SAS addresses of the target ports of SAS target 32.

Figures 1, 5:
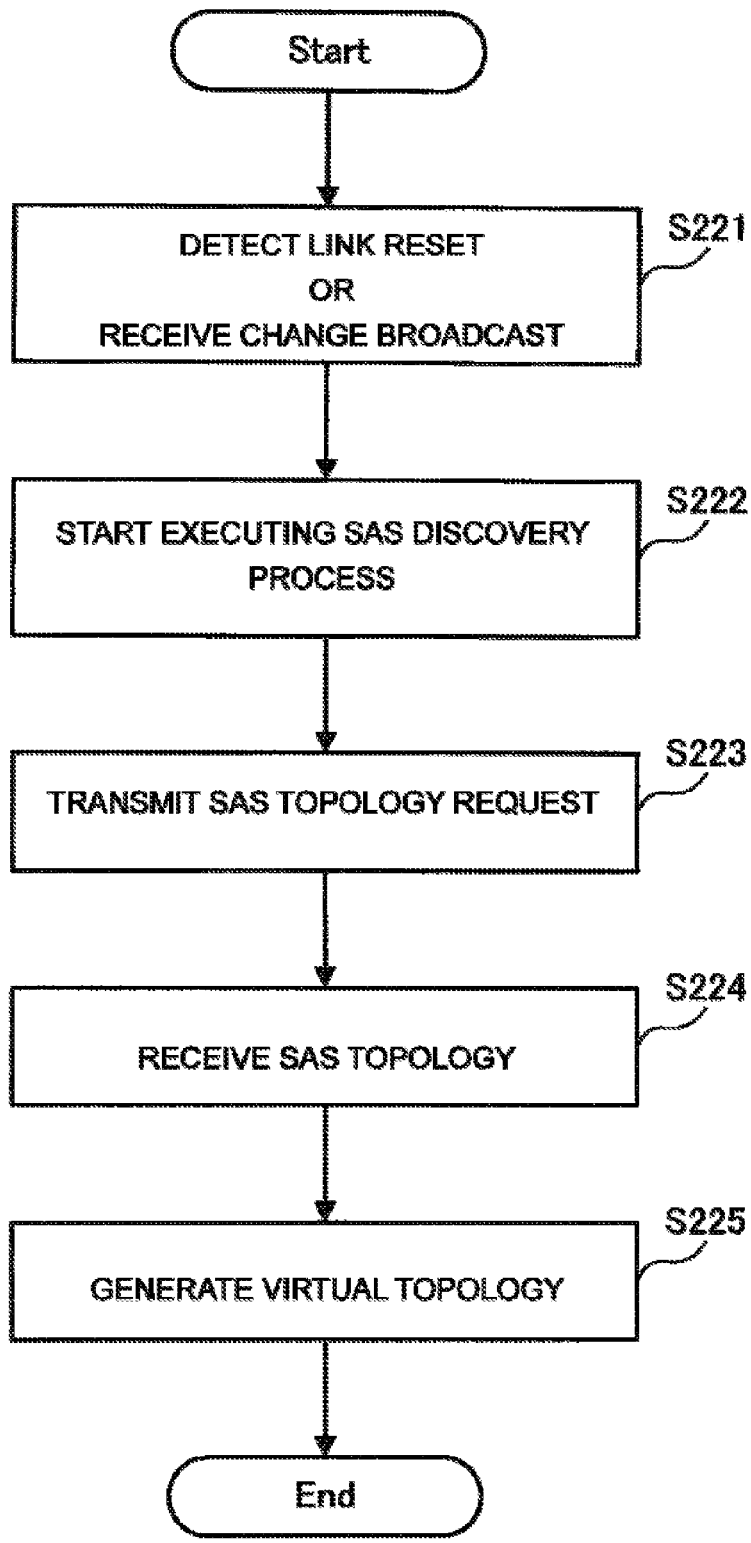
Figures 2, 5:
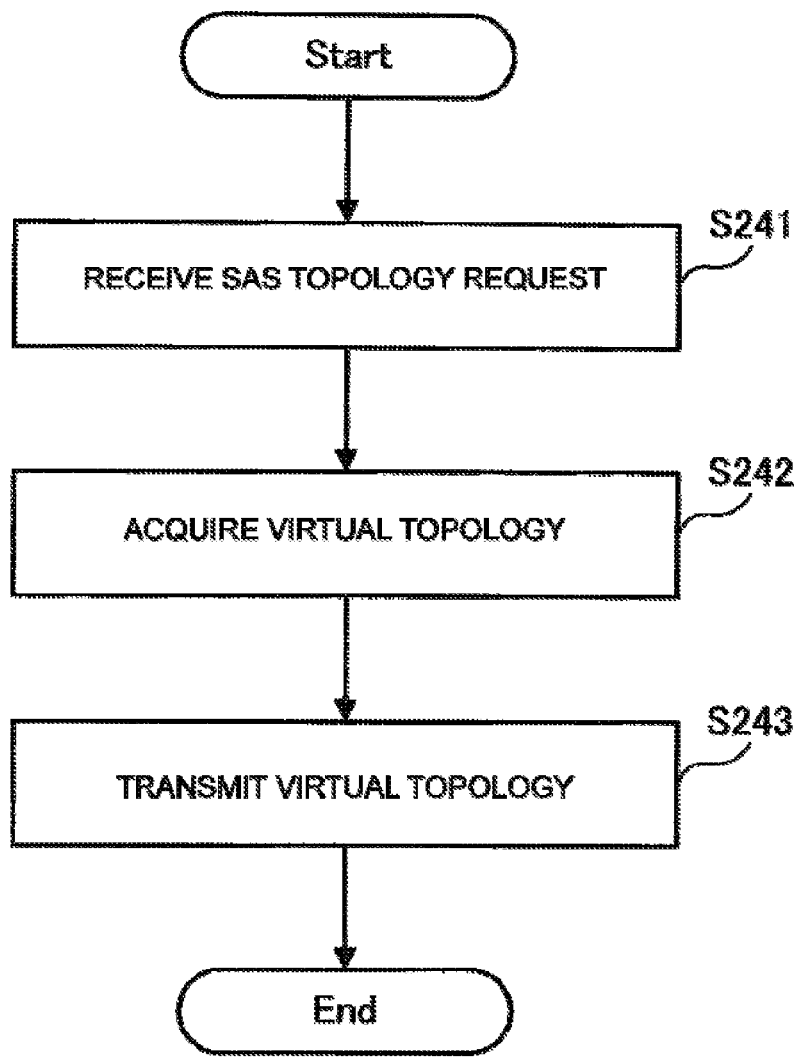

FIGS. 5-1 and 5-2 are flowcharts showing example operations of SAS expander 21 according to embodiments of the present invention. FIG. 5-1 shows an operation in the case where SAS expander 21 executes the SAS discovery process, while FIG. 5-2 shows an operation in the case where SAS initiator 11 executes the SAS discovery process.

First, a description is given of the case where SAS expander 21 executes the SAS discovery process.

As shown in FIG. 5-1, in SAS expander 21, receiver 22 first detects a link reset or receives a change broadcast (Step 221). Thereafter, topology manager 25 starts executing the SAS discovery process for discovering the SAS topology (Step 222).

Subsequently, transmitter 29 queries the other devices for SAS topology (Step 223). Specifically, transmitter 29 first queries any device connected with the PHY thereof for the SAS topology. If the device connected therewith is a SAS expander, the same processing is performed for the further connected SAS expander.

Thereby, receiver 22 receives SAS topology showing the device type, the SAS address, the supported protocol, and the SAS expander connected thereto for each device existing in the SAS domain (Step 224).

Then, topology manager 25 generates a virtual topology based on the SAS topology received by receiver 22 (Step 225). Note that virtual topology makes it appear from the perspective of SAS host 10 that only devices accessible by the HBA are directly connected to SAS expanders. This means that the process of generating the virtual topology includes converting a SAS address of an actual target port into a virtual target port address by referring to the target-port configuration table; converting actual topology into one showing a state in which a SAS expander having a virtual expander address is connected to a virtual target port having the virtual target port address; and the like. Meanwhile, if the SAS topology received by receiver 22 is inconsistent with the definition in the target-port configuration table, topology manager 25 may generate error information. The virtual topology and error information may be stored in memory in SAS expander 21 (not illustrated).

Next, a description is given of the case where SAS initiator 11 executes the SAS discovery process. SAS initiator 11 executes the SAS discovery process in response to a detection of a link reset or a change broadcast. In other words, SAS initiator 11 queries SAS expander 21 for the SAS topology.

Thereby, as shown in FIG. 5-2, receiver 22 in SAS expander 21 receives the SAS topology request from SAS initiator 11 (Step 241). Thereafter, topology manager 25 extracts the virtual topology (Step 242) stored in memory (not illustrated).

Subsequently, transmitter 29 transmits the extracted virtual topology to SAS initiator 11 (Step 243). If error information is stored in memory (not illustrated), transmitter 29 may transmit an error message to SAS initiator 11.

Figure 6:
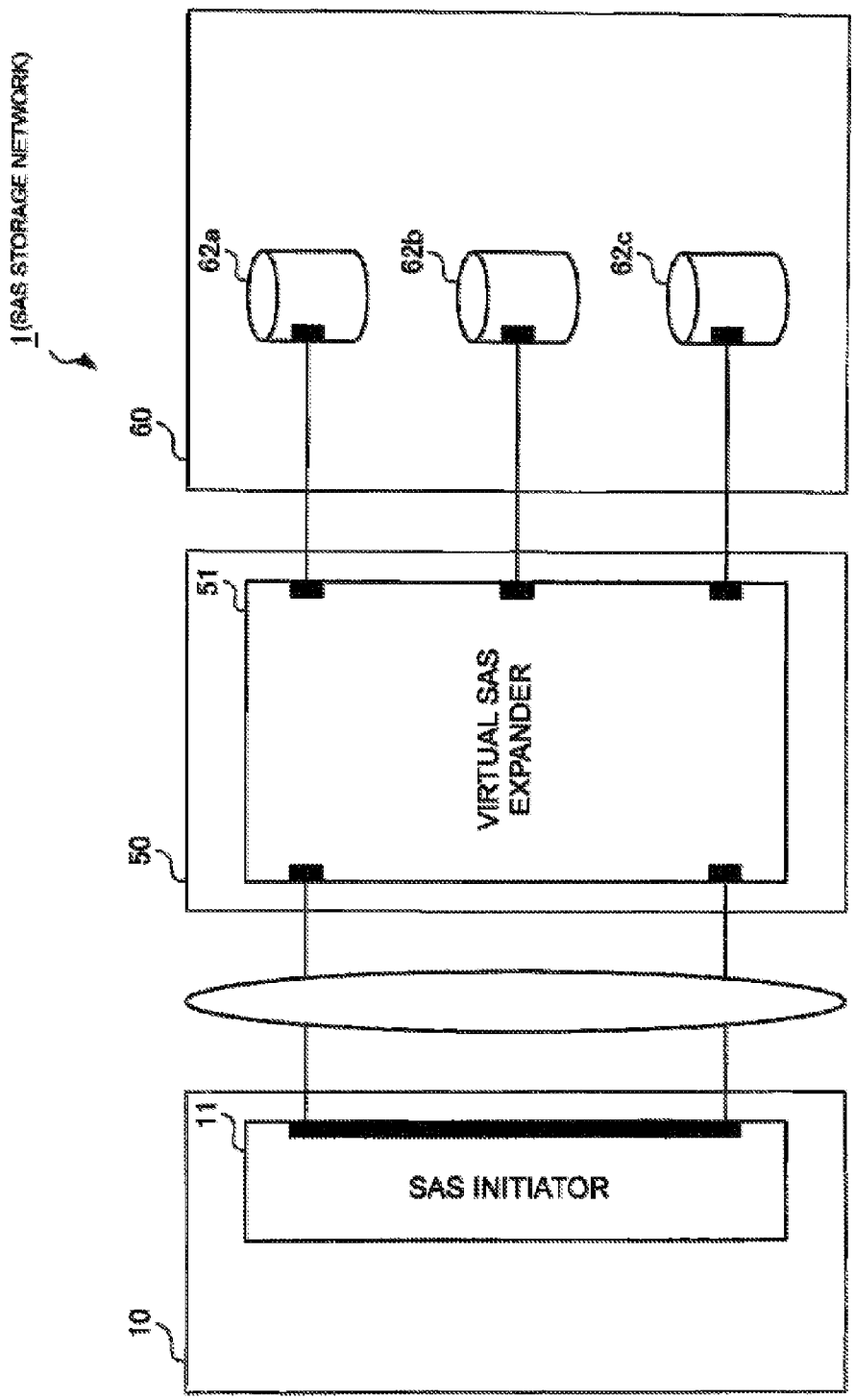
FIG. 6 is a diagram showing how the SAS host sees devices after the SAS expander in an embodiment of the present invention reports the virtual topology.

FIG. 6 shows how SAS host 10 views devices as a result of the processes in FIGS. 4, 5-1, and 5-2. SAS host 10 has the same configuration including the unit serving as SAS initiator 11 as the actual configuration shown in FIG. 1.

In contrast to the configuration shown in FIG. 1 however, SAS switches 20a-20b are recognized as a single SAS switch by SAS host 10. FIG. 6 shows the single SAS switch as a virtual SAS switch 50. SAS host 10 sees the two PHYs of its HBA as connected to a single SAS expander. FIG. 6 shows the single SAS expander as a virtual SAS expander 51.

SAS host 10 also sees SAS targets to be accessed as if they are directly connected to a SAS expander. FIG. 6 shows the SAS targets as virtual SAS targets 62a, 62b, and 62c (hereinafter, each referred to as a virtual SAS target 62). FIG. 6 also shows a SAS storage subsystem as a virtual SAS storage subsystem 60 including virtual SAS targets 62.

Utilizing this virtual configuration makes it possible to establish multiple connections simultaneously and to achieve high performance. Additionally, this prevents a single device from being seen as multiple devices.

(3) Controlling Path by Converting SAS Address of Target Port

As described above, SAS expander 21 has therein a target-port configuration table. SAS expander 21 converts a virtual target port address into a real target port address and thereby performs routing.

Figure 7:
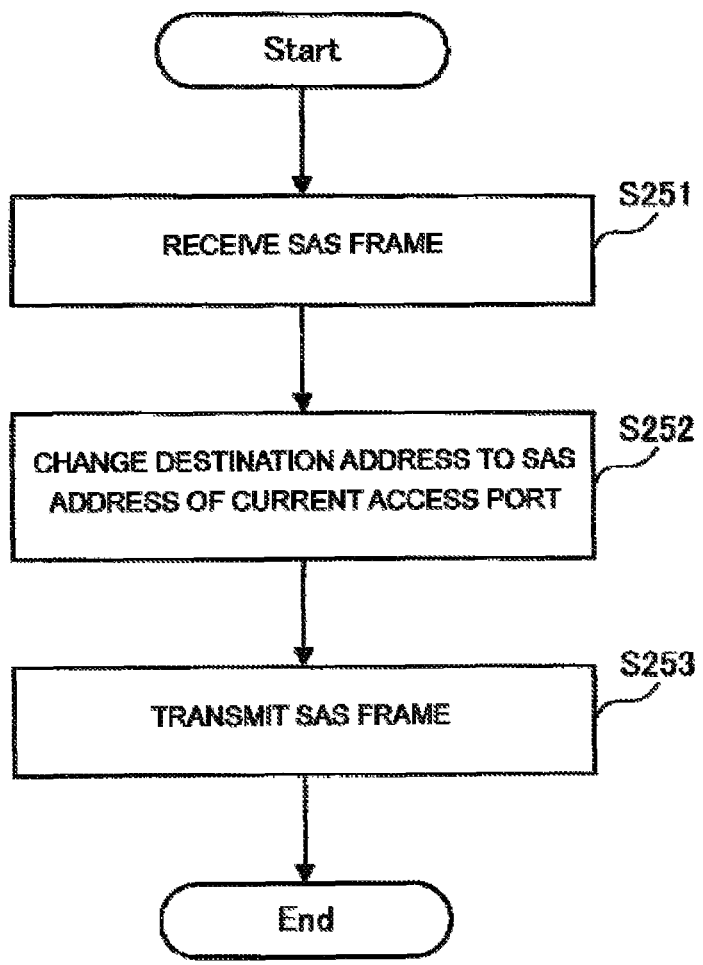
FIG. 7 is a flowchart showing an example of an operation of the SAS expander in an embodiment of the present invention at the time of receiving a SAS frame.

FIG. 7 is a flowchart showing an example of an operation of SAS expander 21 according to an embodiment of the present invention.

In SAS expander 21, receiver 22 firstly receives a SAS frame in which a virtual target port address is set as a destination (Step 251). Then, destination address changer 26 changes the virtual target port address set as the destination to a value of a SAS address of the current access port in the target-port configuration table stored in table storage unit 23 (Step 252).

Subsequently, transmitter 29 forwards the SAS frame to the changed SAS address (Step 253). Generally, the SAS frame is forwarded through a path to a priority target port by setting a value of a SAS address of the priority target port as the SAS address of the current access port.

In this embodiment, such path control is performed, and another control is performed in which one path is switched over to the other path when a failure occurs on the one path.

Figure 8:
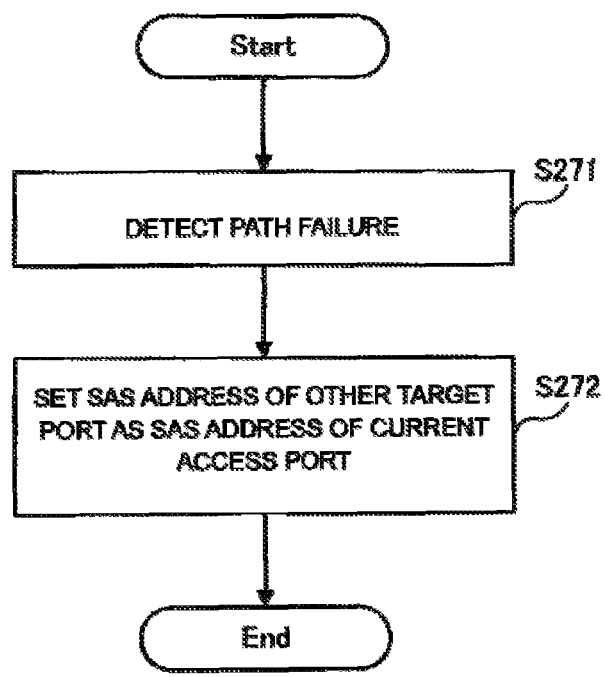
FIG. 8 is a flowchart showing an example of an operation of the SAS expander in an embodiment of the present invention at the time of detecting a failure on a path.

FIG. 8 is a flowchart showing an example of an operation of SAS expander 21 according to an embodiment of the present invention. In SAS expander 21, receiver 22 detects a path failure based on a direct detection of a link down or a broadcast from a SAS expander connected in the network (Step 271).

Then, table update unit 27 changes the value of the SAS address of the current access port in the target-port configuration table stored in table storage unit 23 to a value of a SAS address of another target port (Step 272).

This makes it possible to perform switch-over between paths without the need for a special action by SAS host 10. For example, suppose a case where a failure occurs on link 42a when the path A (initiator port H→link 41a→link 42a→target port DxA) is a priority path. In this case, when a value of a SAS address of the current access port is changed from DxA to DxB, the path to be used for the access is thereby switched over to the path B (initiator port H→link 41a→bridge 43→link 42b→target port DxB).

Control of a multipath is made possible on the switch and storage subsystem sides in a SAS domain utilizing one or more embodiments described herein without installing a multipath driver on SAS host 10. In addition, since the need for installing a multipath driver on SAS host 10 is eliminated, the controlling of the multipath is made possible without depending on the OS of SAS host 10, the storage subsystem, or the switches.

Moreover, merely adding simple functions to SAS expander 21 makes it possible to control the multipath.

Further, this embodiment does not depart from the SAS standards and thus is applicable to a SAS network for general purposes.

Note that the described embodiments are applicable to multiple SAS hosts 10 and multiple SAS targets 32. Furthermore, such embodiments are applicable even to a multipath configuration built up by using one SAS expander or three or more SAS expanders.

Meanwhile, some embodiments of the present invention are provided based on the assumption that bridge 43 is provided for the purposes of making easy automatic information synchronization between SAS expanders 21 and of increasing paths of the multipath, and thereby SAS expander 21 can acquire two SAS addresses of the respective target ports of corresponding SAS target 32. In addition, SAS expander 21 is designed to notify SAS initiator 11 of a virtual target port address instead of the two SAS addresses of the respective target ports. However, alternative embodiments may be provided based on the assumption that bridge 43 is not provided, so that SAS expander 21a acquires one of the SAS addresses of the target ports, coupled to SAS expander 31a, of SAS target 32, and SAS expander 21b acquires one of the SAS addresses of the target ports, coupled to SAS expander 31b, of SAS target 32.

In this case, SAS expander 21a notifies SAS initiator 11 of a virtual target port address of the target port coupled to SAS expander 31a instead of the SAS address thereof, while SAS expander 21b notifies SAS initiator 11 of a virtual target port address of the target port coupled to SAS expander 31b instead of the SAS address thereof.

Here, embodiments of the present invention may be implemented entirely by hardware or entirely by software. Moreover, embodiments of the present invention can alternatively be implemented by both hardware and software. Furthermore, embodiments of the present invention can be implemented as a computer, a data processing system or a computer program product. This computer program product can be provided by being stored in a computer-readable medium. Here, such computer-readable media may comprise any tangible electronic, magnetic, optical, electromagnetic, infrared, or semiconductor media (devices or equipment). Examples of the computer-readable medium may include a semiconductor and solid-state storage device, a magnetic tape, a removable computer diskette, a random access memory (RAM), a read only memory (ROM), a rigid magnetic disc and an optical disc. Examples of the current optical disk include a compact disc read-only memory (CD-ROM), a compact disc-rewritable (CD-R/W) and a DVD.

Various implementations of the present invention have been described by using the above-described illustrative embodiments. However, the technical scope of the present invention is not limited to the described embodiments. It is apparent to those skilled in the art that various changes can be made and alternative embodiments can be employed without departing from the spirit and scope of the present invention.

The present invention makes it possible to control a multipath in a SAS network without the need for installing a multipath driver on a host.

What is claimed is:

1. A method for controlling a multipath in a Serial Attached SCSI (SAS) network including a SAS initiator, a SAS target, a first SAS expander and a second SAS expander, the method comprising:

forming, by the first SAS expander, a first path coupling the SAS initiator and a first port of the SAS target together;

notifying, by the first SAS expander, the SAS initiator of a virtual expander address instead of a SAS address of the first SAS expander, the virtual expander address being a virtual SAS address owned in common by the first SAS expander and the second SAS expander;

notifying, by the first SAS expander, the SAS initiator of a virtual target port address, at least instead of a SAS address of the first port of the SAS target, the virtual target port address being a SAS address of a virtual port of the SAS target;

forming, by the second SAS expander, a second path coupling the SAS initiator and a second port of the SAS target together;

notifying, by the second SAS expander, the SAS initiator of the virtual expander address instead of a SAS address of the second SAS expander;

notifying, by the second SAS expander, the SAS initiator of the virtual target port address, at least instead of a SAS address of the second port of the SAS target;

wherein upon receipt of data having the virtual target port address as a destination address, each of the first SAS expander and the second SAS expander transmits the data to the SAS target by using as the destination address a SAS address of a currently used one of the first port and the second port, and associated with the virtual target port address.

2. The method of claim 1 further comprising:

in response to detecting a failure on a path to a specific one of the first port and the second port, each of the first SAS expander and the second SAS expander changing the SAS address of the currently used one of the first port and the second port and associated with the virtual target port address to the SAS address of an alternate one of the first port and the second port which is other than the specific one of the first port and the second port.

3. The method of claim 1 further comprising:

in response to receiving a topology request, return a topology response, the topology response including a virtual topology, the virtual topology including an SAS address of a virtual target port mapped to a current access port of a plurality of target ports, the virtual topology excluding real SAS addresses of the plurality of target ports.

4. A system for controlling a multipath in a Serial Attached SCSI (SAS) network, comprising:

a first SAS expander to form a first path coupling an SAS initiator and a first port of an SAS target together; and a second SAS expander to form a second path coupling the SAS initiator and a second port of the SAS target together, wherein the first SAS expander notifies the SAS initiator of a virtual expander address instead of its own SAS address, the virtual expander address being a virtual SAS address owned in common by the first SAS expander and the second SAS expander, and notifies the SAS initiator of a virtual target port address, at least instead of a SAS address of the first port of the SAS target, the virtual target port address being a SAS address of a virtual port of the SAS target, and the second SAS expander notifies the SAS initiator of the virtual expander address instead of its own SAS address, and notifies the SAS initiator of the virtual target port address, at least instead of a SAS address of the second port of the SAS target;

wherein upon receipt of data having the virtual target port address as a destination address, each of the first SAS expander and the second SAS expander transmits the data to the SAS target by using as the destination address a SAS address of a currently used one of the first port and the second port, and associated with the virtual target port address.

5. The system according to claim 4, wherein upon detection of a failure on a path to a specific one of the first port and the second port, each of the first SAS expander and the second SAS expander changes the SAS address of the currently used one of the first port and the second port and associated with the virtual target port address to the SAS address of an alternate one of the first port and the second port which is other than the specific one of the first port and the second port.

6. A device that functions as a SAS expander coupling a SAS initiator and a SAS target together, comprising:

a first notification unit to:

cause the SAS initiator to recognize a configuration where the device and a different device serving as SAS expanders are connected to the SAS initiator as a configuration where a single device serving as a SAS expander is connected to a wide port of the SAS initiator, and notify the SAS initiator of a virtual expander address instead of a SAS address of the device, the virtual expander address being a virtual SAS address owned in common by the device and the different device;

a second notification unit to:

cause the SAS initiator to recognize a configuration where a first port of the SAS target is connected to the device and a second port of the SAS target is connected to the different device as a configuration where a port of the SAS target is connected to the single device, notify the SAS initiator of a virtual target port address, at least instead of a SAS address of a first port of the SAS target, the virtual target port address being a SAS address of a virtual port of the SAS target;

a storage unit to store association information which indicates an association between the virtual target port address and a SAS address of a currently used one of the first port and the second port;

a receiver to receive data having the virtual target port address as a destination address from the SAS initiator;

a determination unit to determine, as the destination address of data received by the receiver, the SAS address of the currently used one of the first port and the second port; and a transmitter to transmit data received by the receiver to the SAS address of the currently used one of the first port and the second port as determined by the determination unit.

7. The device according to claim 6, further comprising:

a detection unit to detect a failure on a path to a specific one of the first port and the second port; and a change unit to change the association information to indicate an association between the virtual target port address and an alternate one of the first port and the second port which is other than the specific one of the first port and the second port upon detection of the failure on the path to the specific one of the first port and the second port by the detection unit.

8. A computer program product for controlling a multipath in a SAS network including a SAS initiator, a SAS target, a first SAS expander and a second SAS expander, the computer program product comprising:
  a computer readable storage medium having computer readable program code embodied therewith, which when executed, causes a computer to perform operations comprising:
    forming, by the first SAS expander, a first path coupling the SAS initiator and a first port of the SAS target together;
    notifying, by the first SAS expander, the SAS initiator of a virtual expander address instead of a SAS address of the first SAS expander, the virtual expander address being a virtual SAS address owned in common by the first SAS expander and the second SAS expander;
    notifying, by the first SAS expander, the SAS initiator of a virtual target port address, at least instead of a SAS address of the first port of the SAS target, the virtual target port address being a SAS address of a virtual port of the SAS target;
    forming, by the second SAS expander, a second path coupling the SAS initiator and a second port of the SAS target together;
    notifying, by the second SAS expander, the SAS initiator of the virtual expander address instead of a SAS address of the second SAS expander;
    notifying, by the second SAS expander, the SAS initiator of the virtual target port address, at least instead of a SAS address of the second port of the SAS target such that the SAS initiator recognizes that a single SAS expander is connected to a wide port of the SAS initiator and further that the SAS target is connected to the single SAS expander through a single port; and
    in response to receiving data having the virtual target port address as a destination address, each of the first SAS expander and the second SAS expander transmitting the data to the SAS target by using as the destination address a SAS address of a currently used one of the first port and the second port, and associated with the virtual target port address.

9. The computer program product of claim 8, wherein the computer readable program code further includes computer readable program code to cause the computer to, in response to detecting a failure on a path to a specific one of the first port and the second port, each of the first SAS expander and the second SAS expander changing the SAS address of the currently used one of the first port and the second port and associated with the virtual target port address to the SAS address of an alternate one of the first port and the second port which is other than the specific one of the first port and the second port.

10. The computer program product of claim 8, wherein the computer readable program code further includes computer readable program code to cause the computer to, in response to receiving a topology request, return a topology response, the topology response including a virtual topology, the virtual topology including an SAS address of a virtual target port mapped to a current access port of a plurality of target ports, the virtual topology excluding real SAS addresses of the plurality of target ports.

* * * * *